(12) United States Patent
Dong et al.

(10) Patent No.: US 12,126,302 B2
(45) Date of Patent: Oct. 22, 2024

(54) DEVICE FOR SUPPLYING COLD ENERGY, HEAT ENERGY AND ELECTRICAL ENERGY BY EFFICIENTLY CONVERTING RENEWABLE DEEP-SPACE ENERGIES

(71) Applicant: GUANGZHOU INSTITUTE OF ENERGY CONVERSION, CHINESE ACADEMY OF SCIENCES, Guangzhou (CN)

(72) Inventors: Kaijun Dong, Guangzhou (CN); Bobo Zhang, Guangzhou (CN); Qin Sun, Guangzhou (CN); Haifeng Guan, Guangzhou (CN); Zhanchao Tang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 18/024,062

(22) PCT Filed: Oct. 18, 2021

(86) PCT No.: PCT/CN2021/124297
§ 371 (c)(1),
(2) Date: Mar. 1, 2023

(87) PCT Pub. No.: WO2022/160780
PCT Pub. Date: Aug. 4, 2022

(65) Prior Publication Data
US 2023/0268881 A1   Aug. 24, 2023

(30) Foreign Application Priority Data

Sep. 6, 2021 (CN) .......................... 202111039672.X

(51) Int. Cl.
*H02S 40/44* (2014.01)
*F24S 30/428* (2018.01)
(Continued)

(52) U.S. Cl.
CPC ............ *H02S 40/44* (2014.12); *F24S 30/428* (2018.05); *F25B 23/003* (2013.01); *H02S 20/32* (2014.12); *F24S 80/50* (2018.05)

(58) Field of Classification Search
CPC .......... H02S 40/44; H02S 20/32; H02S 20/30; F24S 30/428; F24S 80/50; F24S 30/42; F25B 23/003; Y02E 10/50
See application file for complete search history.

(56) References Cited

U.S. PATENT DOCUMENTS

| | | | |
|---|---|---|---|
| 2014/0162000 A1* | 6/2014 | Son | E06B 3/66304 428/34 |
| 2021/0219463 A1 | 7/2021 | Raman et al. | |
| 2022/0311378 A1* | 9/2022 | Escarra | H01L 31/0547 |

FOREIGN PATENT DOCUMENTS

| | | |
|---|---|---|
| CN | 103486760 A | 1/2014 |
| CN | 109539602 A | 3/2019 |

(Continued)

*Primary Examiner* — Michael Y Sun
(74) *Attorney, Agent, or Firm* — Bayramoglu Law Offices LLC

(57) ABSTRACT

A device for supplying cold energy, heat energy and electrical energy by efficiently converting renewable deep-space energies includes a solar-energy conversion device, a radiation refrigeration device, a rotary bracket, a dip-angle adjustment component, and a support base. The solar-energy conversion device and the radiation refrigeration device are connected to the rotary bracket in a mutually perpendicular manner, and the rotary bracket is connected to the dip-angle adjustment component which is connected to the support base. The dip-angle adjustment component is configured to adjust a dip angle between the rotary bracket and a hori- (Continued)

zontal plane, and the rotary bracket is configured to drive the solar-energy conversion device and the radiation refrigeration device to rotate, such that a sunward side of the solar-energy conversion device is always perpendicular to light rays irradiated by the sun, and a reflective surface of the radiation refrigeration device is always parallel to the light rays.

5 Claims, 1 Drawing Sheet

(51) Int. Cl.
*F25B 23/00* (2006.01)
*H02S 20/32* (2014.01)
*F24S 80/50* (2018.01)

(56) References Cited

FOREIGN PATENT DOCUMENTS

| | | |
|---|---|---|
| CN | 109631417 A | 4/2019 |
| CN | 111811161 A | 10/2020 |
| CN | 211822931 U | 10/2020 |
| CN | 112361645 A | 2/2021 |
| CN | 216048431 U | 3/2022 |

* cited by examiner

DEVICE FOR SUPPLYING COLD ENERGY, HEAT ENERGY AND ELECTRICAL ENERGY BY EFFICIENTLY CONVERTING RENEWABLE DEEP-SPACE ENERGIES

CROSS REFERENCE TO THE RELATED APPLICATIONS

This application is the national phase entry of International Application No. PCT/CN2021/124297, filed on Oct. 18, 2021, which is based upon and claims priority to Chinese Patent Application No. 202111039672.X, filed on Sep. 6, 2021, the entire contents of which are incorporated herein by reference.

TECHNICAL FIELD

The present invention relates to the field of utilization of renewable energies, and in particular, to a device for supplying cold energy, heat energy and electrical energy by efficiently converting renewable deep-space energies.

BACKGROUND

Renewable deep-space energies include solar energy and radiant energy. As a renewable energy, solar energy has been widely used in China and abroad, and can be used to generate electricity and supply heat and cold energies. The solar energy accounts for an increasing proportion of the world's energy and is one of the major development directions of energy in the future. Radiation refrigeration is a zero-energy and passive refrigeration technique, which directly transmits heat to the space by means of thermal radiation based on the spectral characteristics of the earth's atmosphere in the wave band of 8-13 μm. A radiation refrigeration process proceeds throughout the day without consumption of electrical energy or mechanical energy, showing a good application prospect.

The biggest bottleneck problem for solar energy and radiation refrigeration is that the energy density per unit area is too low, the solar energy can only be applied during the day, and a lot of land resources need and space needs to be occupied, which greatly limits the application effects of solar energy and radiation refrigeration.

Improving the utilization rate of renewable energies per unit area is a research hotspot in China and abroad. Currently, only a single energy utilization mode, either solar-energy utilization or radiation refrigeration, can be implemented in the same region, and the main way to increase the energy density still focuses on increasing the efficiency of solar energy and radiation refrigeration themselves.

SUMMARY

In order to eliminate the shortcomings existing in the prior art, the present invention provides a device for supplying cold energy, heat energy and electrical energy by efficiently converting renewable deep-space energies, which provides high-efficiency conversion and combined utilization of two types of deep-space energies, namely, solar energy and radiant energy, in the same region, thereby greatly improving the energy utilization rate and energy density per unit area, and saving a lot of land resources and space.

To achieve the object above, the present invention employs the following technical solutions.

A device for supplying cold energy, heat energy and electrical energy by efficiently converting renewable deep-space energies includes a solar-energy conversion device, a radiation refrigeration device, a rotary bracket, a dip-angle adjustment component, and a support base, wherein the solar-energy conversion device and the radiation refrigeration device are connected to the rotary bracket in a mutually perpendicular manner, and the rotary bracket is connected to the dip-angle adjustment component which is connected to the support base; the dip-angle adjustment component is configured to adjust a dip angle between the rotary bracket and a horizon; and the rotary bracket is configured to drive the solar-energy conversion device and the radiation refrigeration device to rotate, such that a sunward side of the solar-energy conversion device is always perpendicular to light rays irradiated by the sun, and a reflective surface of the radiation refrigeration device is always parallel to the light rays irradiated by the sun.

As an improvement of the present invention, the solar-energy conversion device is a solar photovoltaic power generation panel, a solar thermal collector, or a solar adsorption refrigeration device, and is configured to convert received solar energy into electrical energy, heat energy or cold energy.

As an improvement of the present invention, the radiation refrigeration device includes light-transmitting thermal insulation materials, light-transmitting radiation refrigeration materials, light-ray reflective plates, and a cooled medium channel, wherein the light-transmitting thermal insulation materials, the light-transmitting radiation refrigeration materials, and the light-ray reflective plates are stacked from outside to inside on both sides of the cooled medium channel;

uncontrollable diffuse-reflection light rays in atmosphere pass through the light-transmitting thermal insulation materials and the light-transmitting radiation refrigeration materials in sequence, are reflected by the light-ray reflective plates, then pass through the light-transmitting radiation refrigeration materials and the light-transmitting thermal insulation materials in sequence and return to the atmosphere, without any energy exchange with an outside world in the whole process; and the light-transmitting radiation refrigeration materials transfer heat to deep space of the universe in the form of radiant light waves of 8-13 μm, and cold energy generated by the light-transmitting radiation refrigeration materials are transferred by heat conduction to a cooled medium in the cooled medium channel via the light-ray reflective plates, thereby allowing radiation refrigeration.

As an improvement of the present invention, the light-transmitting thermal insulation materials are vacuum glass or transparent heat shields.

As an improvement of the present invention, a plurality of the solar-energy conversion devices is provided, and arranged in parallel without mutual sheltering.

As an improvement of the present invention, a plurality of the radiation refrigeration devices is provided, and arranged in parallel without mutual sheltering.

As an improvement of the present invention, the dip-angle adjustment component includes a first lifting rod and a second lifting rod, which are spaced apart and disposed on the support base; and both ends of the rotary bracket are connected to lifting ends of the first and second lifting rods, respectively.

As an improvement of the present invention, the device for supplying cold energy, heat energy and electrical energy by efficiently converting renewable deep-space energies can be used alone or in combination, in which case arrangement positions are free of mutual interference.

Compared with the prior art, the present invention has the following advantageous effects.

1. According to the device for supplying cold energy, heat energy and electrical energy by efficiently converting renewable deep-space energies of the present invention, the solar-energy conversion devices convert the light energy into desired electrical energy and heat energy, thereby enabling the supply of electrical energy and heat energy; the radiation refrigeration devices transfer their own heat energy to the deep space of the universe in the form of radiant light waves, thereby enabling the supply of cold energy; and the entire device provides high-efficiency conversion and combined utilization of two types of deep-space energies, namely, solar energy and radiant energy, in the same region, thereby greatly improving the energy utilization rate and energy density per unit area, and saving a lot of land resources and space.

2. The device for supplying cold energy, heat energy and electrical energy by efficiently converting renewable deep-space energies of the present invention has a variety of functions and forms, can simultaneously or selectively fulfill the functions of supplying cold energy, heat energy and electrical energy, and thus adapts to a wide range of scenarios and requirements.

Description of reference signs: 1—solar-energy conversion device; 2—radiation refrigeration device; 21—vacuum glass; 22—light-transmitting radiation refrigeration material; 23—light-ray reflective plate; 24—cooled medium channel; 3—rotary bracket; 4—first lifting rod; 5—second lifting rod; 6—support base.

DETAILED DESCRIPTION OF THE EMBODIMENTS

To make the object, technical solutions, and effects of the present invention clearer and more explicit, the following further illustrates the present invention in detail in combination with the accompanying drawings and the specific embodiments.

EMBODIMENT

Figure 1:
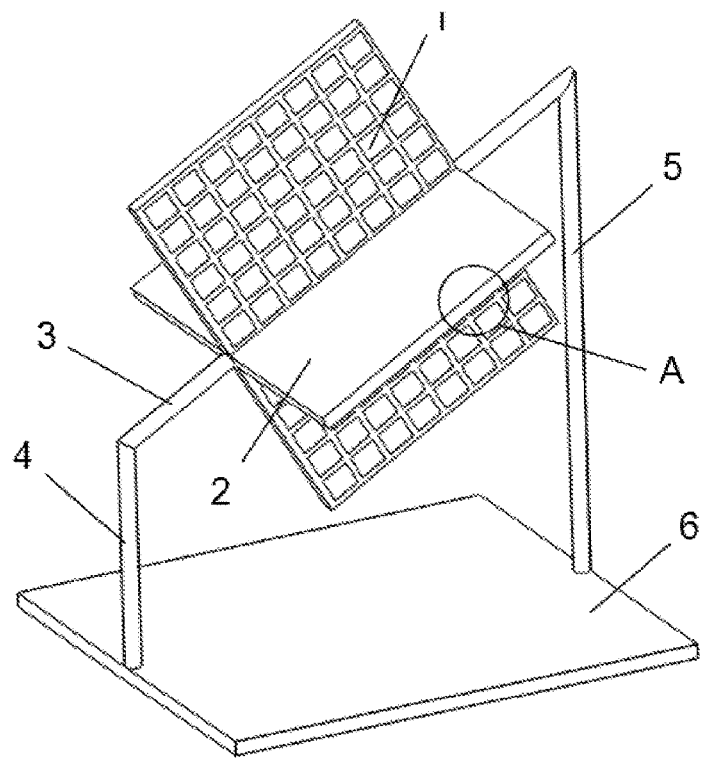
FIG. 1 is a schematic structural diagram of a device for supplying cold energy, heat energy and electrical energy by efficiently converting renewable deep-space energies according to the present invention.

As shown in FIG. 1, this embodiment provides a device for supplying cold energy, heat energy and electrical energy by efficiently converting renewable deep-space energies. The device mainly includes solar-energy conversion devices 1, radiation refrigeration devices 2, a rotary bracket 3, a first lifting rod 4, a second lifting rod 5, and a support base 6.

Figure 3:
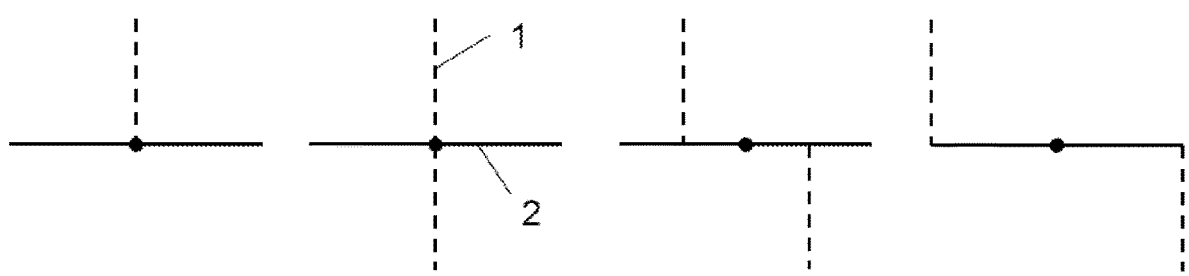
FIG. 3 shows different combination forms of solar-energy conversion devices and radiation refrigeration devices according to the present invention.

The solar-energy conversion devices 1 and the radiation refrigeration devices 2 are fixed at a perpendicular angle and connected to the rotary bracket 3, preferably in combination forms shown in FIG. 3. Specifically, the solar-energy conversion devices 1 are arranged in parallel without mutual sheltering, and the radiation refrigeration devices 2 are also arranged in parallel without mutual sheltering. Perpendicular structures formed by the solar-energy conversion devices 1 and the radiation refrigeration devices 2 can rotate freely around the rotary bracket 3. The first lifting rod 4 and the second lifting rod 5 are spaced apart and fixed on the support base 6, and both ends of the rotary bracket 3 are connected to lifting ends of the first lifting rod 4 and the second lifting rod 5, respectively.

The rotary bracket 3, the first lifting rod 4, and the second lifting rod 5 are each equipped with a power device; the first lifting rod 4 and the second lifting rod 5 work coordinately to allow the adjustment of a dip angle of the rotary bracket 3 relative to the horizontal plane; and the rotary bracket 3 can drive the solar-energy conversion devices 1 and the radiation refrigeration devices 2 to rotate therearound. The coordinated movement of the rotary bracket 3, the first lifting rod 4 and the second lifting rod 5 can ensure that sunward side of the solar-energy conversion devices 1 are always perpendicular to light rays irradiated by the sun, making full use of the solar energy. At the same time, since the radiation refrigeration devices 2 are disposed perpendicular to the solar-energy conversion devices 1, reflective surfaces of the radiation refrigeration devices 2 are always parallel to the light rays irradiated by the sun, such that the radiation refrigeration devices 2 do not reflect sunlight directly, allowing the minimization of the impact of direct solar radiation on radiation refrigeration.

Specifically, the actions of the rotary bracket 3, the first lifting rod 4, and the second lifting rod 5 can be intelligently controlled by means of a program according to the latitude and longitude where the device is located. During the day, the sunward side of the solar-energy conversion devices 1 rotate from east to west following the light rays irradiated by the sun, during the whole process of which the sunward side of the solar-energy conversion devices 1 are always perpendicular to the light rays irradiated by the sun, and the reflective surfaces of the radiation refrigeration devices 2 are always parallel to the light rays irradiated by the sun. During the night, the sunward side of the solar-energy conversion devices 1 return to due east.

The solar-energy conversion devices 1 may be one or more of solar photovoltaic power generation panels, solar thermal collectors, or solar adsorption refrigeration devices, and are configured to convert received solar energy into electrical energy, heat energy or cold energy. Their specific structures are all existing structures, which will not be described in detail.

Figure 2:
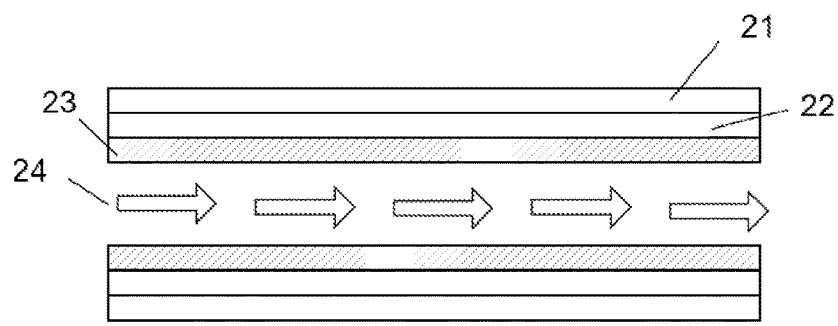
FIG. 2 is a partially enlarged view of a region A in FIG. 1.

The structure of the radiation refrigeration device 2 is shown in FIG. 2. The radiation refrigeration device 2 includes vacuum glass 21, light-transmitting radiation refrigeration materials 22, light-ray reflective plates 23, and a cooled medium channel 24. The light-ray reflective plates 23, the radiation refrigeration materials 22, and the vacuum glass 21 are arranged to be stacked from inside to outside, and the cooled medium channel 24 is formed between the two layers of the light-ray reflective plates 23. The vacuum glass 21 is configured for light transmission and thermal insulation, and certainly, may also be rearranged with other light-transmitting thermal insulation structures, for example, light-transmitting heat shields, etc., to isolate the heat exchange inside and outside the radiation refrigeration device. The light-transmitting radiation refrigeration materials 22 are configured for light transmission and full-time radiation refrigeration, and have the working characteristics similar to those of blackbody radiation, with the thermal radiation mainly emitted in the form of infrared rays with a wavelength of 8-13 µm. The infrared rays in this wave band are difficult to absorb by the atmosphere, and can directly reach the outer space, thereby taking away the heat from the radiation refrigeration devices. The light-ray reflective plates 23 are configured to reflect light rays, such that the radiation refrigeration devices cannot obtain heat from sunlight, providing a prerequisite for radiation refrigeration. The cooled medium channel 24 is configured to transport the cooled medium, so as to timely and effectively distribute, transfer and utilize cold energy.

Specifically, a working process of the radiation refrigeration device 2 is as follows:

uncontrollable diffuse-reflection light rays in the atmosphere pass through the vacuum glass 21 and the light-transmitting radiation refrigeration materials 22 in sequence, are reflected by the light-ray reflective plates 23, then pass through the light-transmitting radiation refrigeration materials 22 and the light-transmitting vacuum glass 21 in sequence and return to the atmosphere, without any energy exchange with the outside world in the whole process.

At the same time, the light-transmitting radiation refrigeration materials 22 are isolated from the heat conduction and convective heat transfer with the outside atmosphere by means of the vacuum glass 2, the working characteristics of the radiation refrigeration materials are similar to those of blackbody radiation, with the thermal radiation wavelength controlled at 8-13 µm; the radiation light waves of 8-13 µm can effectively penetrate the atmosphere to exchange heat with the deep space of the universe at all times, thereby transferring the heat to the deep space of the universe in the form of radiant light waves; the cold energy generated by the radiation refrigeration materials themselves is transferred by heat conduction to the cooled medium via the light-ray reflective plates 23; and the cooled medium timely and effectively distributes, transfers, and utilizes the cold energy by means of the diverse structures of the cooled medium channel 24, thereby allowing radiation refrigeration.

In addition, the device for supplying cold energy, heat energy and electrical energy by efficiently converting renewable deep-space energies may be used alone or in combination, in which case arrangement positions are free of mutual interference, in order to increase the light receiving area of each solar-energy conversion device 1 and the thermal radiation area of each radiation refrigeration device 2, thereby improving the energy utilization rate.

In summary, according to the device for supplying cold energy, heat energy and electrical energy by efficiently converting renewable deep-space energies of the present invention, the solar-energy conversion devices 1 convert the light energy into the desired electrical energy and heat energy, thereby allowing the supply of electrical energy and heat energy; the radiation refrigeration devices 2 transfer their own heat energy to the deep space of the universe in the form of radiant light waves, thereby allowing the supply of cold energy; and the entire device provides the high-efficiency conversion and combined utilization of two types of deep-space energies, namely, solar energy and radiant energy, in the same region, thereby greatly improving the energy utilization rate and energy density per unit area, and saving a lot of land resources and space. At the same time, the special perpendicular design of the solar-energy conversion devices 1 and the radiation refrigeration devices 2 prevents the two from affecting each other during working, which further improves the effect of combined utilization.

The above embodiments are merely for illustrating the technical concept and features of the present invention, and are intended to enable those of ordinary skills in the art to understand and thereby implement the content of the present invention, and the protection scope of the present invention cannot be limited thereto. Any equivalent changes or modifications made according to the substantial contents of the present invention should be construed as falling within the protection scope of the present invention.

What is claimed is:

1. A device for supplying cold energy, heat energy and electrical energy by efficiently converting renewable deep-space energies, comprising a solar-energy conversion device, a radiation refrigeration device, a rotary bracket, a dip-angle adjustment component, and a support base, wherein the solar-energy conversion device and the radiation refrigeration device are connected to the rotary bracket in a mutually perpendicular manner, and the rotary bracket is connected to the dip-angle adjustment component, wherein the dip-angle adjustment component is connected to the support base; the dip-angle adjustment component is configured to adjust a dip angle between the rotary bracket and a horizontal plane; and the rotary bracket is configured to drive the solar-energy conversion device and the radiation refrigeration device to rotate, such that a sunward side of the solar-energy conversion device is always perpendicular to light rays irradiated by a sun, and a reflective surface of the radiation refrigeration device is always parallel to the light rays irradiated by the sun;

wherein the radiation refrigeration device comprises light-transmitting thermal insulation materials, light-transmitting radiation refrigeration materials, light-ray reflective plates, and a cooled medium channel, and the light-transmitting thermal insulation materials, the light-transmitting radiation refrigeration materials, and the light-ray reflective plates are stacked from outside to inside on both sides of the cooled medium channel;

uncontrollable diffuse-reflection light rays in atmosphere pass through the light-transmitting thermal insulation materials and the light-transmitting radiation refrigeration materials in sequence, are reflected by the light-ray reflective plates, then pass through the light-transmitting radiation refrigeration materials and the light-transmitting thermal insulation materials in sequence and return to the atmosphere, without any energy exchange with an outside world in a whole process; and the light-transmitting radiation refrigeration materials transfer heat to a deep space of a universe in a form of radiant light waves of 8 µm-13 µm, and cold energy generated by the light-transmitting radiation refrigeration materials are transferred by heat conduction to a cooled medium in the cooled medium channel via the light-ray reflective plates, thereby allowing radiation refrigeration;

wherein the light-transmitting thermal insulation materials are vacuum glass or transparent heat shields;

wherein the dip-angle adjustment component comprises a first lifting rod and a second lifting rod, wherein the first lifting rod and the second lifting rod are spaced apart and disposed on the support base; and both ends of the rotary bracket are connected to a lifting end of the first lifting rod and a lifting end of the second lifting rod, respectively.

2. The device for supplying cold energy, heat energy and electrical energy by efficiently converting renewable deep-space energies according to claim 1, wherein the solar-energy conversion device is a solar photovoltaic power generation panel, a solar thermal collector, or a solar adsorption refrigeration device, and the solar-energy conversion device is configured to convert received solar energy into electrical energy, heat energy or cold energy.

3. The device for supplying cold energy, heat energy and electrical energy by efficiently converting renewable deep-space energies according to claim 1, wherein a plurality of the solar-energy conversion devices is provided, and arranged in parallel without mutual sheltering.

4. The device for supplying cold energy, heat energy and electrical energy by efficiently converting renewable deep-space energies according to claim 1, wherein a plurality of the radiation refrigeration devices is provided, and arranged in parallel without mutual sheltering.

5. The device for supplying cold energy, heat energy and electrical energy by efficiently converting renewable deep-space energies according to claim 1, wherein the device for supplying cold energy, heat energy and electrical energy by efficiently converting renewable deep-space energies is allowed to be used alone or in combination, wherein arrangement positions are free of mutual interference when the device for supplying cold energy, heat energy and electrical energy by efficiently converting renewable deep-space energies is used in combination.

* * * * *